United States Patent

Moscou

[15] 3,635,663
[45] Jan. 18, 1972

[54] REDUCTION OF THE ALKALI METAL CONTENT OF CRYSTALLINE ALUMINOSILICATES OF THE FAUJASITE TYPE

[72] Inventor: Leo Moscou, Castricum, Netherlands
[73] Assignee: Koninklijke Zwavelzuurfabrieken Voorheen Ketjen N.V., Amsterdam, Netherlands
[22] Filed: Nov. 26, 1969
[21] Appl. No.: 880,438

[30] Foreign Application Priority Data

Dec. 6, 1968 Netherlands..........................6817493

[52] U.S. Cl..................................23/112, 23/111, 252/455
[51] Int. Cl. .......................................................C01b 33/28
[58] Field of Search..................23/111, 112, 113; 252/455 Z

[56] References Cited

UNITED STATES PATENTS 3,402,996  9/1968  Maher et al...............................23/112
3,140,249  7/1964  Plank et al. ........................252/455 X

FOREIGN PATENTS OR APPLICATIONS 1,129,042  10/1968  Great Britain..........................23/111

Primary Examiner—Edward J. Meros
Attorney—Lewis H. Eslinger, Alvin Sinderbrand and Curtis, Morris and Safford

[57] ABSTRACT

In the reduction of the alkali metal content of a crystalline aluminosilicate of the faujasite type by subjecting the latter to a plurality of base exchanges with an aqueous solution containing ions of rare earth metals, there is a treatment of the crystalline aluminosilicate intermediate the base exchanges by which the subsequent base exchange can achieve increased reduction of the alkali metal content. Such intermediate treatment involves adding, to the moist aluminosilicate derived from a prior base exchange, an organic liquid which together with water forms a mixture capable of being azeotropically distilled, heating the suspension thus obtained to boiling temperature, and separating the azeotropically over-distilling water, whereupon the aluminosilicate, which still may be moistened with at least some of the organic liquid, can be subjected to the base exchange following such intermediate treatment.

8 Claims, No Drawings

REDUCTION OF THE ALKALI METAL CONTENT OF CRYSTALLINE ALUMINOSILICATES OF THE FAUJASITE TYPE

This invention relates generally to crystalline aluminosilicates, and more particularly is directed to the reduction of the alkali metal content of such crystalline aluminosilicates.

The invention is generally concerned with those crystalline aluminosilicates which are referred to as molecular sieves or crystalline zeolites, and is particularly concerned with the synthetic crystalline zeolites of the faujasite type. Examples of the last-mentioned zeolites are the so-called zeolite X (disclosed in U.S. Pat. No. 2,882,244) and zeolite Y (disclosed in U.S. Pat. No. 3,130,007).

The composition of these zeolites in their alkali metal form may be reproduced in terms of the molar ratio of the oxides, as follows: $M_2O \cdot Al_2O_3 \cdot wSiO_2 \cdot yH_2O$, wherein M represents an alkali metal atom.

The sodium form of so-called zeolite X has the formula $(0.9\pm0.2)Na_2O \cdot Al_2O_3 \cdot (2.5\pm0.5)SiO_2 \cdot O-8H_2O$; and the sodium form of so-called zeolite Y has the formula $(0.9\pm0.2)Na_2O \cdot Al_2OA3 \cdot (3-6)SiO_2 \cdot O-9H_2O$. These zeolites have a uniform pore structure with apertures having an effective diameter of substantially 6 to 15 A.

The aluminosilicates described are suitable as catalysts and/or catalyst promoters and are, in many cases, enclosed in a matrix of silicon dioxide, aluminum oxide, magnesium oxide, silicon dioxide-aluminum oxide and the like. They are, in particular, suitable as catalysts for the reaction of hydrocarbons, for example, in the cracking of hydrocarbons, whereby hydrocarbon oils having a high boiling range are converted to hydrocarbons having a lower boiling range.

It is known that it is desirable, for the utilization of such aluminosilicates as cracking catalysts, that the zeolites should have as low an alkali metal content as is possible. A high alkali metal content diminishes the thermal structural stability to an undesirable degree, whereby the effective service life of the catalyst is impaired. This detrimental effect of the alkali metal content is described, for example, in Netherlands Pat. application No. 266,989, wherein it is proposed to diminish the alkali metal content by means of a so-called base exchange process. According to this method, the zeolites are repeatedly or continuously contacted with aqueous solutions of salts or other compounds in order to achieve the exchange of the alkali metal ions in the aluminosilicate with the cations in the aqueous solution. In this manner, alkali metal ions may be replaced by calcium, magnesium, hydrogen and/or hydrogen precursors, such as ammonium. It is also known, for example, as described in Netherlands Pat. application No. 296,167, that, in a base exchange of this kind, the alkali metal ions may advantageously be replaced by ions of the rare earth metals. The presence of the last-mentioned ions improves the structural stability of the zeolite and imparts to the zeolite increased resistance to loss of crystallinity.

The base exchange methods for diminishing the alkali metal content are extremely time consuming. Furthermore, if such base exchange methods are applied to zeolites of the faujasite type, and in particular of the so-called zeolite type Y, the alkali metal content, and particularly the sodium content, cannot be decreased below a predetermined level. This minimum value of the alkali metal content is, in the case of zeolite Y, approximately 20 to 25 percent of that in the alkali metal form.

It has further been disclosed, for example, in Netherlands Pat. application No. 6,607,456, which has been laid open to public inspection, that the exchangeability of the alkali metal ions in the alkali aluminosilicates relative to trivalent cations, such as cations of rare earth metals, particularly in the reduction of the alkali metal content by successive base exchanges with an aqueous solution containing ions of rare earth metals, may be improved by calcining the zeolite intermediate the base exchanges. In connection with the foregoing, it has been disclosed that the calcining operation may be performed by heating the crystalline aluminosilicate, after at least one base exchange, to a temperature between 65° and 927° C., and preferably to a temperature in the range between 315° and 927° C., until the moisture content has been reduced to below 90 percent of the saturation value, that is, to a moisture content below about 32 percent based on the weight of dry substance, and preferably until the moisture content has been reduced to no more than 6 percent based on the weight of dry substance. The foregoing process involving a heat treatment intermediate the base exchanges has been used on a large number of alkali metal aluminosilicates, such as those of the A-type, X-type, Y-type, L-type, D-type, T-type K-G-type and mordenite type. Although the intermediate heat treatment does improve the exchangeability of the alkali metal ions relative to trivalent cations, such as, cations of rare earth metals, and thereby increases the final reduction of the alkali metal content as compared with the reduction achievable by base exchanges alone, such heat treatment is rather time consuming. The foregoing results from the fact that the faujasite, which has already been exchanged, at least once, relative to rare earth ions and subsequently washed, must in fact be thereupon transferred to the drier, thermally processed, removed once again from the drier and introduced into a vessel wherein, after dispersion in water, the subsequent base exchange may take place. It has furthermore been found that care must be taken in the heat treatment to ensure that no local temperature differences are set up, in other words, to ensure that drying takes place homogeneously.

Accordingly, it is an object of this invention to avoid the above disadvantages of the known heat treatment intermediate the base exchanges for reducing the alkali metal content of crystalline aluminosilicates of the faujasite type while achieving a similarly enhanced reduction of the alkali metal content.

A specific object is to provide a treatment intermediate a plurality of base exchanges with an aqueous solution containing ions of rare earth metals, which intermediate treatment can be performed on the moist crystalline aluminosilicate as obtained from the preceding base exchange and is effective to increase the efficacy of the subsequent base exchange in reducing the alkali metal content.

In accordance with this invention, the intermediate treatment satisfying the foregoing objects comprises adding to the moist aluminosilicate obtained from the preceding base exchange with an aqueous solution containing ions of rare earth metals an organic liquid which, together with water, forms a mixture capable of being azeotropically distilled, heating the resulting mixture to its boiling temperature, and separating off the azeotropically over-distilling water, whereupon the aluminosilicate particles, from which a major portion of the remaining organic liquid may have been separated, but which may be still moistened with organic liquid can be subjected to the subsequent base exchange with an aqueous solution containing ions of rare earth metals.

Various kinds of organic liquids capable of forming an azeotropic mixture with water can be used in the above described intermediate treatment according to this invention. Very suitable are, for example, azeotropic mixture-forming aliphatic alcohols or esters thereof, such as n-butanol, n-heptanol and amyl acetate. Furthermore, toluene or one or more xylenes or a mixture of these substances may be used with advantage.

In the base exchange which precedes the intermediate treatment according to this invention, the crystalline aluminosilicate is contacted with an aqueous solution of salts of rare earth metals (RE), usually RE-chlorides which contain, predominantly, the chlorides of Ce, Eu, La, Nd, Pr, Sm and Gd, and furthermore also Y-chloride, or with an aqueous solution of "didymium chloride" (a mixture of RE-chlorides having a low Ce content). These aqueous solutions may also contain hydrogen and/or ammonium ions, so that a part of the alkali metal ions in the zeolite is replaced by hydrogen and/or ammonium (ammonium being a hydrogen precursor, which means that it can be converted to hydrogen by aftertreatment, for example by heating). The zeolite may also be subjected to a base exchange by first of all treating it with an aqueous solution of rare earth salts and then with a solution containing hydrogen and/or ammonium ions.

The base exchange, which takes places after the intermediate treatment of the faujasite according to this invention, may be applied either to the crystalline aluminosilicates as such which have already been base-exchanged at least once and subjected to the intermediate treatment, or to compounds in which these aluminosilicates are included in a matrix. Suitable matrix materials are, for example, silica gel, cogels of silicon dioxides and a metal oxide, and the like. Examples of suitable cogels are cogels of silicon dioxide and an oxide of at least one of the metals of groups IIA, IIIA and/or IVA of the Periodic Table of Elements. Such cogels are for example silicon dioxide/beryllium oxide, silicon dioxide/magnesium oxide, silicon dioxide/aluminum oxide, silicon dioxide/thorium oxide, silicon dioxide/titanium dioxide gels and ternary combinations such as silicon dioxide/aluminum oxide/thorium oxide, silicon dioxide/aluminum oxide/zirconium oxide, silicon dioxide/aluminum oxide/magnesium oxide and silicon dioxide/magnesium oxide/zirconium oxide gels. Cogels of silicon dioxide and aluminum oxide are preferred. The silicon dioxide frequently forms the main component in the above-mentioned gels and the content thereof is generally 55 to 100 percent by weight, whereas the metal oxide content varies between 0 and 45 percent by weight.

The faujasites which, according to the invention, have been subjected to the intermediate treatment and once again base-exchanges, are extremely suitable as catalyst components, in particular as a component of cracking catalysts. If the base exchange occurring after the intermediate treatment is effected with a faujasite already included in a suitable matrix, for example a silicon dioxide/aluminum oxide matrix, the product thereby obtained may be used as a catalyst. If the base exchange after the intermediate treatment has taken place with the faujasites as such, then, for preparation of the catalyst, the product thus obtained must be included in the desired matrix material.

The catalystically active product finally obtained is usually processed in a known manner, for example by extrusion, pelleting and the like, to form shaped pieces thereof, such as grains, pills, tablets and the like.

In the intermediate treatment according to the invention, the amount of the organic liquid added to the moist product of a preceding base exchange is preferably in excess of the amount required to disperse such product therein. Further, the distillation of the azeotropic mixture is continued until the residual water content is reduced to a maximum of approximately 25 percent, based on the weight of dry faujasite, and preferably until such residual water content is no more than about 15 percent.

The intermediate treatment according to this invention may be effected once between two successive base exchanges, as described, or such intermediate treatment may be effected on a number of occasions between successive base exchanges where more than two base exchange steps are employed.

The invention will now be further described with reference to the following illustrative examples:

EXAMPLE I

A synthetic crystalline aluminosilicate of the faujasite type, that is, a so-called zeolite Y having a molar silicon dioxide/aluminum oxide ratio of 5.2:1 and an $Na_2O$ content of 13.0 percent based on the weight of the dry substance, was successively subjected to a base exchange with $RECl_3$, to an intermediate treatment according to the invention and, finally, to renewed base exchange with $RECl_3$. The following procedures were employed for the three stages of the process:

THE FIRST BASE EXCHANGE

One hundred grams of the Na-Y zeolite, calculated as dry substance, was stirred in 595 ml. of deionized water, whereupon 66 g. $RECl_3·6$ aq (corresponding to 31 g. $RE_2O_3$) dissolved in 155 ml. of deionized water were added.

The mixture was allowed to react for half an hour at 55° C., with continuous agitation. The zeolite was then filtered and washed successively, with 290 ml. of deionized water, with 290 ml. of an aqueous 2 percent solution of $RECl_3·6$ aq (corresponding to a 1 percent $RE_2O_3$ solution) and finally with 2,000 ml. of deionized water. In this manner, a zeolite having a rare earth oxide content ($RE_2O_3$ content) of 14.5 percent by weight and an $Na_2O$ content of 3.5 percent by weight, calculated on the dry substance, was obtained.

THE INTERMEDIATE TREATMENT

The still moist zeolite-Y which had undergone the above first base exchange with $RECl_3$ was dispersed in an excess of toluene, more specifically in 1,000 ml. of toluene, and brought to boiling temperature in a container provided with a reflux cooler. The azeotropically over-distilling water was separated off. The distillation was continued for a predetermined period until the residual water content of the faujasite, as determined with the aid of Karl Fischer reagents, was reduced to 26.2 percent based on the weight of dry substance. Upon completion of the azeotropic distillation to the extent indicated, the suspension was cooled and the upper organic layer, that is, the major portion of the toluene was poured off, leaving the faujasite which was still moistened with toluene.

THE SECOND BASE EXCHANGE

One hundred g. of the RE-Y-zeolite moistened with toluene resulting from the above intermediate treatment (having 3.5 percent by weight $Na_2O$ calculated on the basis of the dry substance) was stirred into 635 ml. of deionized water. After the pH had been brought to 8.0 with 25 percent $NH_4OH$, there were added 2062 g. of $RECl_3$ 6 aq (corresponding to 29 g. $Re_2O_3$) dissolved in 200 ml. of deionized water, whereupon the mixture was allowed to react for half an hour at 55° C., with continuous agitation. The zeolite, exchanged for the second time, was filtered and washed successively, with 290 ml. of deionized water, with 290 ml. of an aqueous 2 percent $RECl_3$ 6 aq solution (corresponding to a 1 percent $Re_2O_3$ solution) and with 2,000 ml. of deionized water. The Y-zeolite was found to have an $Na_2O$ content of 2.9 percent based on the weight of dry substance.

COMPARATIVE EXAMPLE A

For purpose of comparison, the above first and second base exchanges were repeated on the same zeolite-Y, but without the intermediate treatment according to this invention, and it was found that the residual $Na_2O$ content was reduced to 3.3 percent based on the weight of dry substance.

EXAMPLE II

The procedures of example I were repeated with the same zeolite-Y, but with the azeotropic distillation during the intermediate treatment being continued until the residual water content of the faujasite was reduced to 20.5 percent based on the weight of dry substance. Such further azeotropic distillation resulted in the faujasite having an $Na_2O$ content of 2.8 percent, based on the weight of dry substance, following the second base exchange.

EXAMPLE III

The procedures of example I were repeated with the same zeolite-Y, but with the azeotropic distillation during the intermediate treatment being continued until the residual water content of the faujasite was reduced to 13.8 percent based on the weight of dry substance. Such further azeotropic distillation resulted in the faujasite having an $Na_2O$ content of 1.7 percent based on the weight of dry substance, following the second base exchange.

EXAMPLE IV

The procedures of example I were repeated with the same zeolite-Y, but with the azeotropic distillation during the intermediate treatment being continued until the residual water content of the faujasite was reduced to 8.0 percent based on the weight of dry substance. Such further azeotropic distillation resulted in the faujasite having an $Na_2O$ content of 1.4 percent, based on the weight of dry substance, following the second base exchange.

EXAMPLE V

The procedures of example I were repeated with the same zeolite-Y, but with the azeotropic distillation during the intermediate treatment being continued until the residual water content of the faujasite was reduced to 1.6 percent based on the weight of dry substance. Such further azeotropic distillation resulted in the faujasite having an $Na_2O$ content of 1.4 percent based on the weight of dry substance, following the second base exchange.

EXAMPLE VI

The procedures of example I were repeated with the same zeolite-Y, except that, during the intermediate treatment, 2,000 ml. butanol-1 were substituted for the toluene and the azeotropic distillation was continued until no further water was transferred, with the measurement of the residual water content at the end of the intermediate treatment being omitted. Following the second base exchange, the resulting faujasite had an $Na_2O$ content of 2.3 percent based on the weight of dry substance.

EXAMPLE VII

The procedures of example I were repeated with the same zeolite-Y, except that, during the intermediate treatment, 2,000 heptanol-1 were substituted for the toluene and the azeotropic distillation was continued until no further water was transferred, with the measurement of the residual water content at the end of the intermediate treatment being omitted. Following the second base exchange, the resulting faujasite had an $Na_2O$ content of 1.9 percent based on the weight of dry substance.

EXAMPLE VIII

The procedures of example I were repeated with the same zeolite-Y, except that, during the intermediate treatment, 1,500 ml. p-xylene were substituted for the toluene and the azeotropic distillation was continued until no further water was transferred, with the measurement of the residual water content at the end of the intermediate treatment being omitted. Following the second base exchange, the resulting faujasite had an $Na_2O$ content of 2.0 percent based on the weight of dry substance.

By way of summary, the essential characteristics and results of the foregoing examples are given in the following table.

TABLE

| Example | Organic liquid in intermediate treatment | Residual water content at end of azeotropic distillation (wt. % of dry substance) | $Na_2O$ content after second base exchange (wt. % of dry substance) |
| --- | --- | --- | --- |
| I | toluene | 26.2 | 2.9 |
| II | toluene | 20.5 | 2.8 |
| III | toluene | 13.8 | 1.7 |
| IV | toluene | 8.0 | 1.4 |
| V | toluene | 1.6 | 1.4 |
| VI | butanol | not measured | 2.3 |
| VII | heptanol | not measured | 1.9 |
| VIII | xylene | not measured | 2.0 |
| A | (no intermediate treatment) | | 3.3 |

From the foregoing it will be apparent that each intermediate treatment according to this invention substantially enhances the reduction of the alkali metal content of the faujasite (compare examples I–VIII with example A), and further that the enhanced reduction of the final alkali metal content is particularly pronounced in those cases (see: examples III–VIII) where the azeotropic distillation has been continued for a sufficient period of time to reduce the residual water content to no more than 15 percent.

Although precise illustrative examples of the invention have been described herein, it is to be noted that the invention is not limited to those precise examples, and that various changes and modifications may be effected therein by one skilled in the art without departing from the scope or spirit of the invention.

What is claimed is:

1. In the method for reducing the alkali metal content of a crystalline aluminosilicate of the faujasite type by subjecting said crystalline aluminosilicate to a plurality of base exchanges with an aqueous solution containing ions of rare earth metals; an intermediate treatment between said base exchanges comprising adding to the moist aluminosilicate derived from a preceding base exchange a quantity of an organic liquid sufficient to disperse said aluminosilicate therein and which, together with the water in said moist aluminosilicate, forms an azeotropic mixture, heating said mixture to its boiling point so as to effect the azeotropic distillation thereof, separating off the water which is azeotropically over-distilled, and continuing said azeotropic distillation until a substantial proportion of said water has been separated off, whereupon the resulting aluminosilicate is available to be subjected to the following base exchange for enhanced reduction of its alkali metal content thereby.

2. The method according to claim 1, in which said azeotropic distillation is continued until the water content of said aluminosilicate has been reduced to a maximum of 25 percent based on the weight of dry substance.

3. The method according to claim 1, in which said azeotropic distillation is continued until the water content of said aluminosilicate has been reduced to a maximum of 15 percent based on the weight of dry substance.

4. The method according to claim 1, in which said amount of the organic liquid is in excess of the amount required to disperse said aluminosilicate therein.

5. The method according to claim 1, in which said organic liquid is selected from the group consisting of azeotropic mixture-forming aliphatic alcohols and esters thereof.

6. The method according to claim 1, in which said organic liquid is selected from the group consisting of toluene, butanol, heptanol, xylene and mixtures thereof.

7. The method according to claim 1, in which said aluminosilicate is subjected to said following base exchange while moistened with said organic liquid.

8. The method according to claim 7, in which a major portion of said organic liquid is separated from said aluminosilicate before subjecting the latter to said following base exchange.

* * * * *